United States Patent [19]

Neukirchen et al.

[11] 4,301,058
[45] Nov. 17, 1981

[54] FLAMEPROOFING ADDITIVES FOR THERMOPLASTIC SYNTHETIC RESINS

[75] Inventors: Ernst Neukirchen, Cologne; Utto Kerscher, Lechenich, both of Fed. Rep. of Germany

[73] Assignee: Chemische Fabrik Kalk GmbH, Cologne, Fed. Rep. of Germany

[21] Appl. No.: 110,572

[22] Filed: Jan. 9, 1980

[30] Foreign Application Priority Data

Feb. 12, 1979 [DE] Fed. Rep. of Germany ....... 2905253

[51] Int. Cl.$^3$ ............................................. C08L 67/00
[52] U.S. Cl. .................................. 260/40 R; 252/604; 252/609; 260/45.7 R
[58] Field of Search ....... 260/40 R, 45.95 G, 45.95 B, 260/45.7 RL, 45.85 R; 252/604, 609

[56] References Cited

U.S. PATENT DOCUMENTS

| | | | |
|---|---|---|---|
| 3,259,593 | 7/1966 | Eichhorn | 260/45.7 RL |
| 3,590,014 | 6/1971 | Burt | 260/45.95 G |
| 3,668,155 | 6/1972 | Raley | 260/45.7 RL |
| 3,699,077 | 10/1972 | Murray | 252/609 |
| 3,751,396 | 8/1973 | Gall | 260/40 R |
| 4,151,223 | 4/1979 | Neuberg et al. | 260/45.7 RL |
| 4,173,561 | 11/1979 | Tabana et al. | 260/45.95 G |

*Primary Examiner*—Lewis T. Jacobs
*Attorney, Agent, or Firm*—Millen & White

[57] ABSTRACT

A flameproofing additive for thermoplastic synthetic resin compositions comprises 60–30 wt. % of a lower melting, flame retardant organic bromine compound which melts at 80°–200° C. and 40–70 wt. % of a higher melting, flame retardant organic bromine compound which melts at 280°–400° C., each of the flame retardant, organic bromine compounds being thermally stable at the processing temperatures to which the thermoplastic synthetic resin is to be exposed after being combined with the flameproofing additive.

18 Claims, No Drawings

FLAMEPROOFING ADDITIVES FOR THERMOPLASTIC SYNTHETIC RESINS

BACKGROUND OF THE INVENTION

Three different methods are primarily employed for flameproofing thermoplastic molding compositions using halogen-containing flame retardants. Firstly, the flame retardants can be admixed with the pulverulent thermoplastics by the plastics manufacturer prior to production of the granulated material, optionally together with synergistic agents. Such a granulated material can then be worked into flame retardant molded components by the plastics processor on conventional extruders or injection-molding machines. Secondly, the processor can perform the task of admixing flame retardants with the synthetic resin granules, using flame retardant concentrates (master batches) in granulated form for this purpose. A third possibility, available to the manufacturer as well as the consumer of synthetic resins, is to mix the powdery flame retardants with synthetic resin granules in a mixer, with the concomitant use of adhesion promoters.

When the first method is employed, the processor lacks the capability of affecting the burning behavior of the supplied molding compositions and of the manufactured products which are subjected to various flame retardance tests. In such a case, the processor must employ the second or third method.

However, difficulties have been found to occur in the mode of operation of the second method, inasmuch as the synthetic resin granules and the granules of the flame retardant concentrates are of differing specific gravity. Consequently, especially when a pneumatic conveyance of the mixtures is involved, non-mixing can very readily occur resulting in inhomogeneous products with nonuniform properties.

Similarly, difficulties are also encountered in the third process. Although the thus-manufactured products can be adapted to the required flame retardance standards very easily by adding varying amounts of flame retardant, this method is disadvantageous since the flame retardant components employed must have melting points which are below the processing temperature of the respective thermoplastics. Higher-melting components are not sufficiently homogeneously distributed during plasticization in the mixing portion of the screws, which portion is short in most cases. As a consequence, the injection-molded or extruded synthetic resin articles have inhomogeneous zones (fisheyes or striae) with substantially modified physical properties. Thus, in such molded components, the tensile strength, the tear strength, and the elongation at rupture is in many instances reduced to 35% and the impact or notch impact strength to 60%. Even if the flame retardant components are ground very finely, this difficulty cannot be overcome in most cases.

SUMMARY OF THE INVENTION

Consequently, it is an object of this invention to provide flame retardant components which can be applied in powder form to the surfaces of synthetic resin granules and yet yield, during the processing of these granules, entirely homogeneous molded articles.

Upon further study of the specification and appended claims, further objects and advantages of this invention will become apparent to those skilled in the art.

These objects have been attained by providing flame retardant components for thermoplastic synthetic resins in the form of organic bromine compounds, optionally together with antimony trioxide, which are added to pulverulent or granulated synthetic resin compositions. These flame retardant components are distinguished in that they comprise a mixture of at least two flame retardant, organic bromine compounds, i.e., one of which melts at 80°–200° C., preferably 140°–170° C., and one of which melts at 280°–400° C., preferably 280°–320° C., each of the organic bromine compounds being molecularly thermally stable at the general processing temperatures of thermoplastic synthetic resins, i.e., 180°–350° C., especially 220°–280° C.

DETAILED DISCUSSION

By means of the flame retardant components of this invention, it is possible to flameproof thermoplastic homopolymers as well as copolymers.

Typical thermoplastic resins to which this invention is applicable include those mentioned in Modern Plastics Encyclopedia, N. Y. 1975, Guide to Plastics, Property and Specification Charts, whose disclosure is incorporated by reference herein.

The low-melting component in the flame retardant mixture acts as a solubilizer. This component melts at the processing temperature of the synthetic resin and forms, together with the higher-melting component which usually has remained in the solid phase, a melt or pasty mass which is readily distributed in a homogeneous fashion in the molten thermoplastic resin, so that a completely uniform molded article is produced using otherwise fully conventional procedures including conventional techniques, e.g., plasticizing screws.

In general, accordingly, this invention is drawn to a flame retardant additive for a thermoplastic synthetic resin comprising at least one flame retardant organic bromine compound which is melted at the processing temperature of the thermoplastic resin, and, normally, at least one flame retardant organic bromine compound which remains in solid form at the same temperature.

Flame retardant, organic bromine compounds are well known. Any of these conventional compounds can be employed as long as they meet the melting point requirements of this invention and are otherwise compatible with the synthetic resin composition. For example, such flame retardant compounds disclosed in, e.g., R. Burkhardt et al, Flammschutzmittel auf der Basis von Tetrabromxylol (Tetrabromoxylene Based Fireproofing Means), Chemiker-Zeitung 102 (1978), pp. 11–18; The Chemistry and Uses of the Fire Retardants, J. W. Lyons, New York 1970, e.g., Table 3, 11 page 100; and Bromhaltige Flammschutzmittel Zur Brandschutzausruestung Von Kunststoffen (brominous flame proofing means for flame-proofing plastics), Kunststoffjournal 1979, 6-16, whose disclosures are incorporated by reference herein, may be employed.

For example, suitable high-melting bromine compounds, e.g., those melting at 280°–400° C. include monomeric, oligomeric and polymeric compounds. Monomeric compounds include, for example: decabromodiphenyl, decabromodiphenyl ether and brominated terphenyl of at least 11 bromine atoms in the molecule. Oligomeric and polymeric compounds include, for example: polytribromostyrene, polydibromostyrene, polytetrabromoxylylene terephthalate, polypentabromobenzyl acrylate, polypentabromophenylethyl acrylate and brominated polyphenylene oxide.

Suitable low-melting bromine compounds, e.g., those melting at 80°–200° C., include, for example, tetrabromobisphenol A, tetrabromobisphenol A dibromopropyl ether, pentabromobenzyl acetate and pentabromophenylethyl bromide.

It is furthermore possible for the flame retardant mixtures of this invention to include not only one higher-melting and one lower-melting bromine compound, but also mixtures of two or more of the above-defined higher- and/or lower-melting compounds.

The amount of the higher-melting bromine compound or bromine compounds in the flame retardant mixture is generally 40–70%, preferably 50–60%, by weight of the total mixture and, correspondingly, the amount of the lower-melting bromine compound or bromine compounds is generally 60–30%, preferably 50–40% by weight of the total mixture. The optional antimony trioxide is generally included, when used, in amounts of 20–40, preferably 25–30% by weight of the total mixture.

In general, in use, the amount of the flame retardant additive mixture of this invention is 1–40 wt. %, preferably 5–20 wt. %, based on the weight of the synthetic resin.

The flame retardant mixture of this invention is employed in the fully conventional manner of other flame retardants. Thus, the manner and timing of its mixing with the synthetic resin as well as the use of other conventional additives, e.g., plasticizers, adhesion promoters, etc. are in accordance with fully conventional techniques and considerations.

Certain flame retardant mixtures of this invention have been found to be especially advantageous for certain polymers. These include decabromodiphenyl ether and tetrabromobisphenol A for flameproofing polystyrene and ABS [acrylonitrile-butadiene-styrene] polymer; mixtures of polytetrabromoxylylene terephthalate and tetrabromobisphenol A for flameproofing glass-fiber-reinforced polybutylene glycol terephthalate; and mixtures of polytribromostyrene and tetrabromobisphenol A dibromopropyl ether for flameproofing polyolefins.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A plow type Lancaster mixer is charged with 10 kg of polybutadiene-modified, high-impact polystyrene (HIPS) in granular form. While the mixer is in operation, 0.1 kg of a mixture of 70 parts by weight of pentabromodiphenyl ether and 30 parts by weight of tribromocresyl phosphate as adhesion promoter and thereafter 0.85 kg of decabromodiphenyl ether and 0.4 kg of antimony trioxide are added to the charge. After a mixing time of about 5 minutes, the pulverulent agents are firmly fixed to the surfaces of the granules so that the mixture is practically dust-free.

EXAMPLE 2

In correspondence with EXAMPLE 1, 0.1 kg of the adhesion promoter, then a mixture of 0.7 kg of decabromodiphenyl ether and 0.3 kg of tetrabromobisphenol A, and subsequently 0.3 kg of antimony trioxide are applied to 10 kg of HIPS.

EXAMPLE 3

In a fluid mixer, 0.1 kg of the adhesion promoter and then 1.5 kg of decabromodiphenyl and 0.5 kg of antimony trioxide are applied to 10 kg of ABS granules, in accordance with EXAMPLE 1.

EXAMPLE 4

Analogously to EXAMPLE 3, 0.1 kg of the adhesion promoter, then a mixture of 0.85 kg of decabromodiphenyl and 0.85 kg of tetrabromobisphenol A and thereafter 0.5 kg of antimony trioxide are applied to 10 kg of ABS granules.

EXAMPLE 5

Corresponding to EXAMPLE 1, 0.1 kg of the adhesion promoter and then 1.0 kg of polytetrabromoxylene terephthalate and 0.4 kg of antimony trioxide are applied to 10 kg of polybutylene glycol terephthalate (PBTP) with a 30% glass fiber content.

EXAMPLE 6

Analogously to EXAMPLE 5, 0.1 kg of the adhesion promoter, then a mixture of 0.6 kg of polytetrabromoxylylene terephthalate and 0.4 kg of tetrabromobisphenol A and thereafter 0.4 kg of antimony trioxide are applied to 10 kg of PBTP with a 30% glass fiber content.

EXAMPLE 7

Corresponding to EXAMPLE 3, 0.1 kg of the adhesion promoter and thereafter 0.8 kg of polytribromostyrene and 0.35 kg of antimony trioxide are applied to 10 kg of low-pressure polyethylene (HDPE).

EXAMPLE 8

Analogously to EXAMPLE 7, 0.1 kg of the adhesion promoter, then a mixture of 0.5 kg of polytribromostyrene and 0.5 kg of tetrabromobisphenol A dibromopropyl ether and thereafter 0.35 kg of antimony trioxide are applied to 10 kg of HDPE.

The mixtures of EXAMPLES 1–4, 7 and 8 are injection-molded on an injection-molding machine into standard injection-molded articles. The mixtures of EXAMPLES 5 and 6 are processed into panels by way of a single-screw extruder with a fishtail die; from these panels, standard test rods are cut out. The tests in the table set forth below are carried out with the samples.

As for the flammability test UL 94 of Underwriters Laboratories U.S.A., the following is to be noted:

A sample of a length of 127 mm and a width of 12.7 mm is clamped into a holder so that the long axis of the sample extends vertically and its front edge is 9.5 mm above the burner pipe of a bunsen burner. The burner is ignited remote from the specimen; the nonluminous flame is adjusted to a height of 19 mm and then the burner is placed under the center of the bottom edge of the specimen. After 10 seconds the burner is removed and the after-burning time and after-glowing time of the specimen are measured. After extinction is complete, the specimen is exposed to the flame for a second time for 10 seconds, and the second after-burning and afterglowing times are determined.

Thereafter, the specimen is graded as follows:

HB = the specimen continues to burn after removal of the flame;

V-0 = no after-burning time of, in total, more than 10 seconds; no after-glowing time over 30 seconds after second exposure to flame; no dripping [burning particles] which would ignite cotton wool placed underneath;

V-1 = no after-burning time of, in total, more than 50 seconds; no after-glowing time over 60 seconds after second exposure to flame; no dripping which would ignite cotton wool placed underneath;

V-2 = no after-burning time of, in total, more than 50 seconds; no after-glowing time over 60 seconds after second exposure to flame; specimen may drip burning particles and may [is allowed to] ignite cotton wool placed underneath.

|  | Tear Strength DIN 53455 N/mm² | Elongation at Rupture DIN 53455 m./m. | Impact Strength DIN 53453 kJ/m² | Notch Impact Strength DIN 53453 kJ/m² | Burning Test UL 94 3.2 mm. | Remarks |
|---|---|---|---|---|---|---|
| HIPS without flameproofing | 26 | 0.43 | 63 | 8 | HB | Injection-molded articles show fisheyes and streaks |
| HIPS acc. to Example 1 | 24 | 0.25 | 31 | 4.5 | V-2 | |
| HIPS acc. to Example 2 | 25 | 0.40 | 54 | 7 | V-2 | |
| ABS without flameproofing | 45 | 0.2 | n.r.(*) | 15 | HB | Injection-molded articles show fisheyes |
| ABS acc. to Example 3 | 42 | 0.1 | 30 | 6.5 | V-0 | |
| ABS acc. to Example 4 | 44 | 0.2 | 60 | 12 | V-0 | |
| PBTP with 30% glass fiber without flameproofing | 116 | 0.03 | 34 | 10 | HB | Extruded panels show fisheyes and streaks |
| PBTP acc. to Ex. 5 | 63 | 0.01 | 8 | 2.5 | V-0 | |
| PBTP acc. to Ex. 6 | 99 | 0.02 | 19 | 5.5 | V-0 | |
| HDPE without flameproofing | 35 | 8.0 | n.r.(*) | 18 | HB | Injection-molded articles show fisheyes |
| HDPE acc. to Ex. 7 | 28 | 3.0 | 36 | 8.5 | V-2 | |
| HDPE acc. to Ex. 8 | 33 | 7.0 | 68 | 14.5 | V-2 | |

(*) n.r. = no rupture.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flameproofing additive for thermoplastic synthetic resin compositions, comprising 60-30 wt. % of a lower-melting, flame retardant brominated aryl-containing organic bromine compound which melts at 80°-200° C. and 40-70 wt. % of a higher-melting, flame retardant brominated aryl-containing organic bromine compound which melts at 280°-400° C., each of the flame retardant organic bromine compounds being thermally stable at the processing temperature to which the thermoplastic synthetic resin is to be exposed after being combined with the flameproofing additive.

2. The flameproofing additive of claim 1, comprising at least two of said higher-melting bromine compounds, and at least two of said lower-melting bromine compounds.

3. The flameproofing additive of claim 1 comprising 20-40 wt. % of antimony trioxide.

4. The flameproofing additive of claim 1 wherein the lower-melting bromine compound is tetrabromobisphenol A, tetrabromobisphenol A dibromopropyl ether, pentabromobenzyl acetate or pentabromophenylethyl bromide and the higher-melting bromine compound is decabromodiphenyl, decabromodiphenyl ether, a brominated terphenyl of at least 11 bromine atoms in the molecule, polytribromostyrene, polydibromostyrene, polytetrabromoxylylene terephthalate, polypentabromobenzyl acrylate, polypentabromophenylethyl acrylate or brominated polyphenylene oxide.

5. A flameproof composition comprising a thermoplastic synthetic resin and an amount of the flameproofing additive of claim 1 effective to render the composition flameproof.

6. The flameproof composition of claim 5, wherein the thermoplastic synthetic resin is pulverulent or granulated.

7. A flameproof composition comprising a thermoplastic synthetic resin and an amount of the flameproofing additive of claim 3 effective to render the composition flameproof.

8. A flameproof composition comprising a thermoplastic synthetic resin and an amount of the flameproofing additive of claim 4 effective to render the composition flameproof.

9. A flameproof composition comprising a thermoplastic synthetic resin and 1-40 wt. % of the flameproofing additive of claim 1 based on the weight of the thermoplastic synthetic resin.

10. The flameproof composition of claim 5, wherein the synthetic resin is polystyrene or acrylonitrile-butadiene-styrene and the bromine compounds are decabromodiphenyl ether and tetrabromobisphenol A.

11. The flameproof composition of claim 5, wherein the synthetic resin is glass-fiber-reinforced polybutylene glycol terephthalate and the bromine compounds are polytetrabromoxylylene terephthalate and tetrabromobisphenol A.

12. The flameproof composition of claim 5, wherein the synthetic resin is a polyolefin and the bromine compounds are polytribromostyrene and tetrabromobisphenol A dibromopropyl ether.

13. A flame retardant composition comprising a pulverulent or granulated thermoplastic synthetic resin which is to be further processed by heating and an effective amount of a flameproofing additive comprising 60–30 wt. % of a lower-melting, flame retardant brominated aryl-containing organic bromine compound which melts at the temperature of the heating treatment to which the synthetic resin will be exposed and 40–70 wt. % of a higher-melting, flame retardant brominated aryl-containing organic bromine compound which remains unmelted at said temperature.

14. A method for flameproofing a thermoplastic synthetic resin composition which comprises heat treating the flameproof composition of claim 13 at a temperature greater than the melting point of said lower-melting, flame retardant organic bromine compound but not greater than the melting point of said higher-melting, flame retardant organic bromine compound.

15. A flameproofing additive for thermoplastic synthetic resin compositions of claim 1 consisting essentially of said lower-melting and higher-melting, flame retardant brominated aryl-containing organic bromine compounds.

16. A flame retardant composition of claim 13 comprising at least two of said higher-melting bromine compounds, and at least two of said lower-melting bromine compounds.

17. A flame retardant composition of claim 13 wherein the flameproofing additive further comprises 20–40 wt. % of antimony trioxide.

18. A flame retardant composition of claim 13 wherein the amount of flameproofing additive is 1–40% based on the weight of the thermoplastic synthetic resin.

* * * * *